June 12, 1951 G. E. HENNING 2,556,276
APPARATUS FOR SIMULTANEOUSLY ADVANCING AND
WORKING ORGANIC PLASTIC MATERIAL
Filed Nov. 28, 1947 2 Sheets-Sheet 1

INVENTOR
G. E. HENNING
BY
ATTORNEY

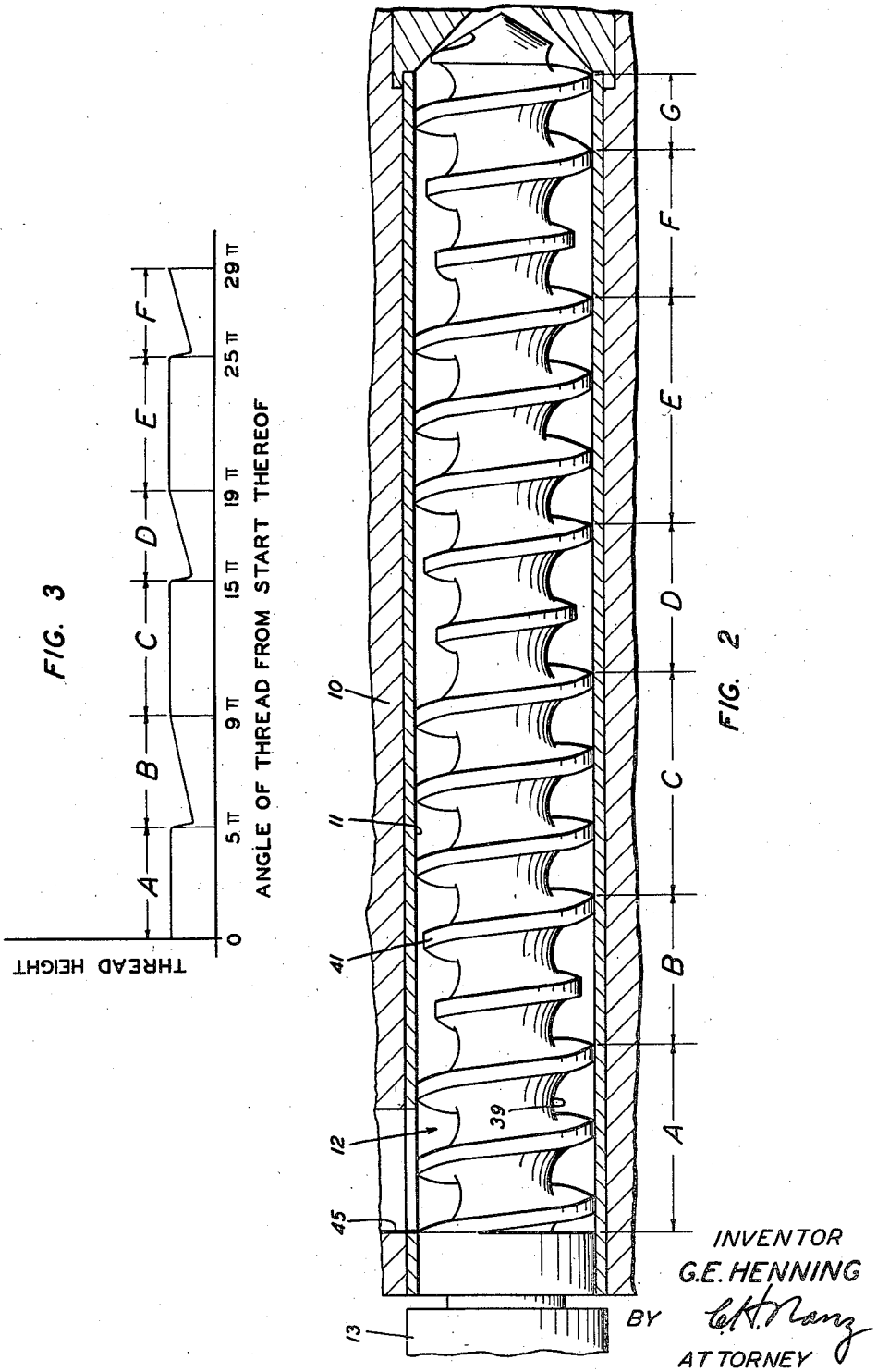

Patented June 12, 1951

2,556,276

UNITED STATES PATENT OFFICE 2,556,276

APPARATUS FOR SIMULTANEOUSLY ADVANCING AND WORKING ORGANIC PLASTIC MATERIAL

George E. Henning, Baltimore, Md., assignor to Western Electric Company, Incorporated, New York, N. Y., a corporation of New York Application November 28, 1947, Serial No. 788,368

5 Claims. (Cl. 18—14)

This invention relates to apparatus for simultaneously advancing and working organic plastic material, and more particularly to extrusion screws for simultaneously forcing organic plastic material through extrusion cylinders and working the material.

In the manufacture of extruded products, such as insulated conductors, organic plastic material, such as vulcanizable compounds including rubber or synthetic rubber-like materials or compounds of thermoplastic material, sometimes are worked to thoroughly mix and plasticize the material so that it may be extruded readily. The material then is inserted into an extruder, which extrudes the material upon a conductor while the material is plastic. Such working operations are relatively expensive and require considerable handling of the material.

An object of the invention is to provide new and improved apparatus for simultaneously advancing and working organic plastic material.

A further object of the invention is to provide new and improved extrusion screws for simultaneously forcing organic plastic material through extrusion cylinders and plasticizing the material as it is forced through the extrusion cylinders.

An apparatus illustrating certain features of the invention includes a stock screw provided with a constant diameter root portion and a thread which has an alternately increasing and decreasing depth along the length of the screw so that a compound advanced by the screw along an extrusion cylinder is repeatedly expanded and contracted, whereby the compound is plasticized and thoroughly mixed as it is advanced through the extrusion cylinder.

A complete understanding of the invention may be obtained from the following detailed description of an apparatus forming a specific embodiment thereof, when read in conjunction with the appended drawings, in which:

Fig. 2 is a reduced, fragmentary, vertical section of a portion of the apparatus, and Fig. 3 is a graph illustrating certain features of the invention.

Figure 1:
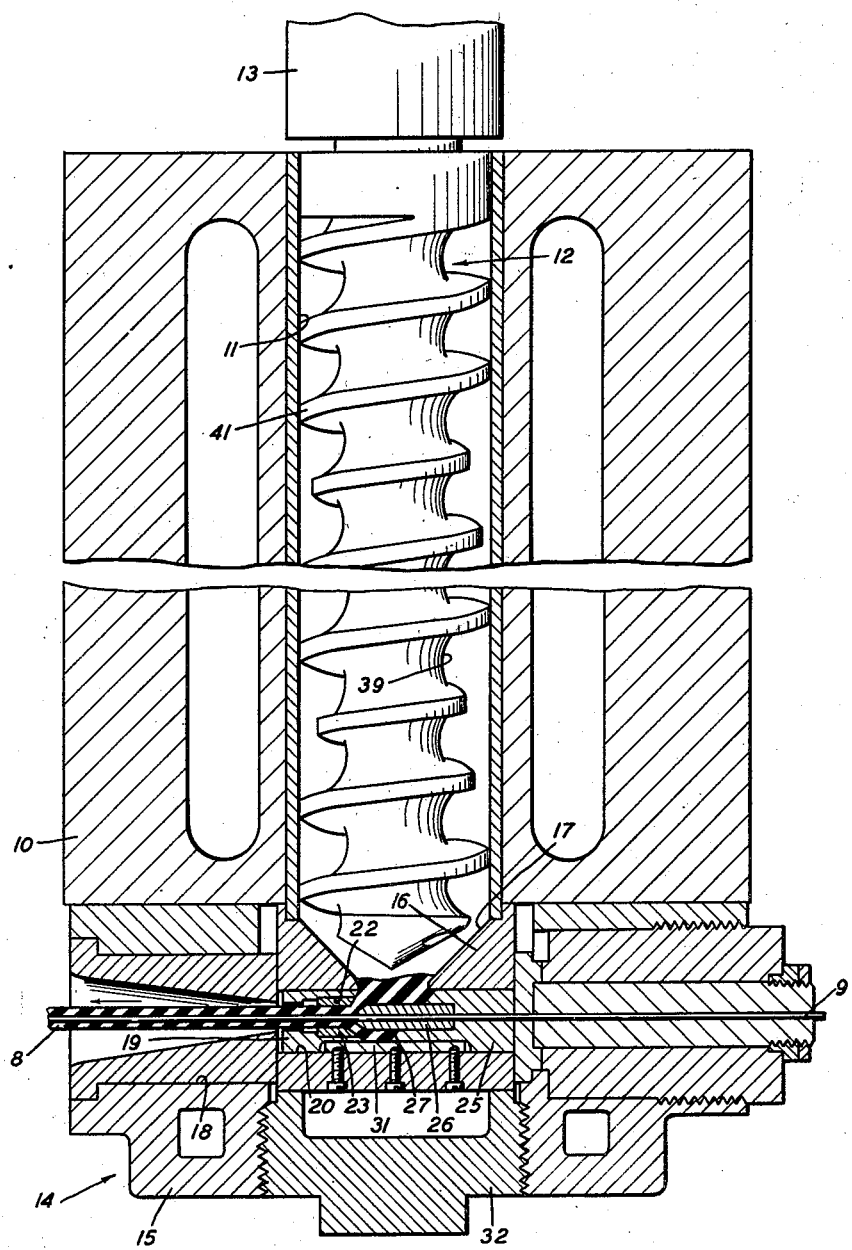
Fig. 1 is a fragmentary, horizontal section of an extrusion apparatus illustrating certain features of the invention.

Referring now in detail to the drawings, there is shown in Fig. 1 a continuous extrusion apparatus for forming a covering 8 from a compound including organic plastic material, such as a compound including rubber, a synthetic rubber-like material, or a thermoplastic material, around a filamentary conductor 9, which may be bare or may be covered with a textile or plastic covering. The extrusion apparatus includes a heated extrusion cylinder 10 having a uniform diameter cylindrical bore 11 formed therein in which a stock screw 12 is rotatably mounted. The stock screw is rotated by a shaft 13 (Fig. 2) to force the plastic compound under a high pressure to an extruding head 14 (Fig. 1). The extruding head includes a hollow body member 15 into which fits a tool holder 16 having a tapered opening 17, which forms a continuation of the bore 11 and communicates with a bore 18 formed in the extruding head transversely of the tapered opening 17. An annular die holder 19 positioned in the exit end of a bore 20 in the tool holder has a counterbore 22 formed therein in which is mounted a forming die 23.

The conductor 9 is advanced toward the left, as viewed in Fig. 1, by suitable conductor-advancing means, such as a capstan (not shown), through a core tube holder 25 and a core tube 26, which extends from the core tube holder 25. The core tube holder is provided with an inclined concave surface 27 for deflecting the compound toward the die 23. An aligning plate 31 maintains the die holder 19 and the core tube holder 25, and thereby the die 23 and the core tube 26, centered relative to each other in the bore 20, and a retaining nut 32 holds these elements in the extruding head 14.

The stock screw 12 includes a generally cylindrical root portion 39 having a substantially uniform diameter throughout its length, and also is provided with a thread 41 extending outwardly from the root portion 39. The bore 11 has a uniform diameter along its entire length, and encloses the stock screw 12 from a compound-receiving delivery portion thereof, designated by the letter A (Fig. 2), to a delivery portion thereof, which is designated by the letter G. The cylinder 10 also is provided with a charging opening 45 near the receiving portion A through which material to be extruded may be introduced into the bore 11. The depth of the thread 41 is full in the portion A thereof, decreases sharply to a tapered working portion designated by the letter B, and increases gradually in the portion B to a delivery portion C, in which the depth is full. The depth of the thread decreases sharply from the delivery portion C to a tapered working portion designated by the letter D, in which the depth gradually increases from left to right, as viewed in Fig. 2, to full depth at an end of a delivery portion designated by the letter E. The depth of the thread decreases sharply from the portion E to a working portion designated by the letter F, and increases gradually in the portion F to full depth at the delivery portion G.

Operation

In the operation of the apparatus described hereinabove, the stock screw 12 is rotated in the extrusion bore 11 by the shaft 13 (Fig. 2). Relatively cold plastic material, e. g. material at room temperature, is introduced into the bore 11 through the opening 45, and the thread 41 forces the compound to the right, as viewed in Fig. 2, through the extrusion bore 11 into the extrusion head 14 (Fig. 1). As the material is so advanced, the delivery portions A, C, E and G of the thread 41 (Fig. 2) subject it to high pressures and high conveying forces, and the working portions B, D and F of the thread each subjects the material to low pressures and low conveying forces. In each of the portions B, D and F the material slips back over the periphery of the thread as the screw is rotated, and the periphery of these portions of the thread and the wall of the extrusion cylinder adjacent thereto mill the material therebetween. The portions B, D and F also thoroughly turbulate and mix the material. The milling action between each of the tapered working portions and the portion of the cylinder wall adjacent thereto is increased as the material is advanced from the start of each working portion to the end thereof. The alternate compressing and expanding and the intense mixing and milling serves to thoroughly plasticize the material so that its extrudability is high when it reaches the extruding head.

The above-described extrusion screw 12 serves to heat, plasticize and mix the plastic material as the material is being forced through the continuous extrusion apparatus. Hence, the necessity of pre-milling and pre-heating operations, which formerly were required to plasticize the material before it could be introduced into a continuous extrusion apparatus, are minimized by the extrusion screw 12, and much labor and equipment may be saved by the above-described extrusion screw. The above-described apparatus is suitable for plasticizing and extruding thermoplastic compounds as well as thermosetting compounds with little or no pre-plasticizing operations on the compounds.

What is claimed is:

1. An apparatus for simultaneously advancing and working organic plastic material, which comprises an extrusion cylinder having an imperforate, smooth-walled bore therein of substantially uniform diameter throughout its length, and a stock screw positioned in the extrusion cylinder and having a starting and a delivery end, said stock screw being provided with a root of uniform diameter and a thread extending substantially from the starting end thereof to the delivery end thereof, said thread being of alternately increasing and decreasing diameter so that the clearance between the thread and the wall of the bore varies alternately from shallow to deep.

2. An apparatus for simultaneously advancing and working organic plastic material, which comprises an extrusion cylinder having a smooth-walled bore therein of substantially uniform diameter throughout its length, and a stock screw having a starting end and a tip end, said stock screw being provided with a root portion of substantially uniform diameter and a thread extending substantially from the starting end thereof to the tip end thereof, said thread being provided with a series of full depth portions, sharply decreasing depth portions and gradually increasing depth portions along its length from the starting end of the screw to the tip end thereof.

3. An apparatus for simultaneously advancing and working organic plastic material, which comprises an extrusion cylinder having a smooth-walled bore therein of substantially uniform diameter throughout its length, and a stock screw mounted rotatably in the bore, said stock screw being provided with a root portion and also having at least one thread of alternately increasing and decreasing diameter.

4. An apparatus for simultaneously advancing and working organic plastic material, which comprises an extrusion cylinder having a smooth-walled bore therein of substantially uniform diameter throughout its length, and a stock screw having a root of uniform diameter and also being provided with at least one thread, said thread having a full depth portion, a sharply decreasing depth portion and a portion gradually increasing to full depth in the order named.

5. An apparatus for simultaneously advancing and working organic plastic material, which comprises an extrusion cylinder having a smooth-walled bore of uniform diameter throughout its length and having an entrance end and an exit end, a stock screw mounted rotatably in the bore, said stock screw having a root portion of substantially uniform diameter throughout its length, said stock screw also being provided with at least one thread, said thread varying from the entrance end of the bore to the exit end thereof in a series of portions of full depth extending to portions of decreasing depth extending to portions of increasing depth.

GEORGE E. HENNING.

REFERENCES CITED

The following references are of record in the file of this patent:

UNITED STATES PATENTS

| Number | Name | Date |
|---|---|---|
| 441,640 | Chase | Dec. 2, 1890 |
| 693,750 | Smith | Feb. 18, 1902 |
| 1,367,196 | Lucas | Feb. 1, 1921 |
| 1,849,291 | Gordon | Mar. 15, 1932 |
| 1,886,592 | Royle | Nov. 8, 1932 |
| 1,904,884 | Royle | Apr. 18, 1933 |
| 2,319,859 | Hale | May 25, 1943 |
| 2,370,469 | Johnson et al. | Feb. 27, 1945 |